United States Patent
Shimoshimano

(10) Patent No.: US 10,176,306 B2
(45) Date of Patent: Jan. 8, 2019

(54) INFORMATION PROCESSING APPARATUS, EVALUATION METHOD, AND STORAGE MEDIUM FOR EVALUATING APPLICATION PROGRAM

(71) Applicant: JVC KENWOOD Corporation, Yokohama-shi (JP)

(72) Inventor: Hideo Shimoshimano, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 367 days.

(21) Appl. No.: 14/938,067

(22) Filed: Nov. 11, 2015

(65) Prior Publication Data

US 2016/0171191 A1    Jun. 16, 2016

(30) Foreign Application Priority Data

Dec. 16, 2014 (JP) .................................. 2014-253769
Dec. 16, 2014 (JP) .................................. 2014-253770

(51) Int. Cl.
*G06F 21/10* (2013.01)
*G06F 21/12* (2013.01)

(52) U.S. Cl.
CPC ............ *G06F 21/105* (2013.01); *G06F 21/10* (2013.01); *G06F 21/12* (2013.01); *G06F 21/121* (2013.01); *G06F 2221/0773* (2013.01)

(58) Field of Classification Search
CPC ........................ G06F 21/105; G06F 2221/0773
See application file for complete search history.

(56) References Cited

U.S. PATENT DOCUMENTS

| | | | | |
|---|---|---|---|---|
| 7,499,196 B2* | 3/2009 | Nakata | ................. | G03G 21/043 358/1.9 |
| 8,375,079 B2* | 2/2013 | Kuwabara | ......... | H04M 1/72522 380/231 |
| 8,904,350 B2* | 12/2014 | Mahmud | ............. | G06F 11/3672 717/120 |
| 8,904,351 B2* | 12/2014 | Mahmud | ............. | G06F 11/3672 717/120 |
| 2001/0011253 A1* | 8/2001 | Coley | ..................... | G06F 21/10 705/59 |
| 2008/0215468 A1* | 9/2008 | Monsa-Chermon | ... | G06Q 10/00 705/34 |
| 2008/0243699 A1* | 10/2008 | Hilerio | .................. | G06F 21/105 705/59 |
| 2011/0202433 A1* | 8/2011 | Yokoyama | ............ | G06F 21/105 705/28 |

(Continued)

FOREIGN PATENT DOCUMENTS

| | | |
|---|---|---|
| JP | 2006-338591 A | 12/2006 |
| JP | 2014-164392 A | 9/2014 |

*Primary Examiner* — Linglan E Edwards
(74) *Attorney, Agent, or Firm* — Venable LLP; Michael A. Sartori; Laura G. Remus

(57) ABSTRACT

An application program is installable in an information processing apparatus. A detection unit detects the activation of the application program. After the activation of the application program is detected by the detection unit, an acquisition unit acquires the history of an operation performed by a user on the application program. A determination unit determines, using as a parameter the history of the operation acquired by the acquisition unit, the termination of evaluation of the application program performed by the user.

7 Claims, 11 Drawing Sheets

(56) References Cited

U.S. PATENT DOCUMENTS

2013/0254113 A1* 9/2013 Singh ...................... G06F 21/10
                                                    705/59
2014/0157429 A1* 6/2014 Kinoshita ............. G06F 21/105
                                                    726/26

* cited by examiner

| (NUMBER OF TIMES) | FUNCTION A | FUNCTION B | FUNCTION C | FUNCTION D | FUNCTION E | ... |
|---|---|---|---|---|---|---|
| BUTTON OPERATION | 1 | 0 | 2 | 4 | 1 | |
| MOUSE OPERATION | 1 | 0 | 3 | 1 | 0 | |
| SCREEN TRANSITION | 2 | 0 | 4 | 0 | 0 | |
| COMMAND OPERATION | 0 | 0 | 1 | 0 | 1 | |
| ... | | | | | | |

FIG.7B

| (NUMBER OF TIMES) | SCREEN A | SCREEN B | SCREEN C | SCREEN D | SCREEN E | ... |
|---|---|---|---|---|---|---|
| BUTTON OPERATION | 2 | 1 | 0 | 0 | 1 | |
| MOUSE OPERATION | 2 | 1 | 2 | 1 | 2 | |
| SCREEN TRANSITION | 1 | 2 | 1 | 0 | 1 | |
| COMMAND OPERATION | 0 | 1 | 1 | 0 | 1 | |
| ... | | | | | | |

FIG.9

|  | SCENARIO A | SCENARIO B | SCENARIO C |
|---|---|---|---|
| FIRST TIME | 3 MINUTES AND 30 SECONDS | 2 MINUTES | 1 MINUTE AND 30 SECONDS |
| TENTH TIME | 1 MINUTE AND 30 SECONDS | 45 SECONDS | 20 SECONDS |

|  | SCENARIO A | SCENARIO B | SCENARIO C |
|---|---|---|---|
| FIRST TIME | 10 | 7 | 6 |
| SECOND TIME | 1 | 1 | 0 |

22

INFORMATION PROCESSING APPARATUS, EVALUATION METHOD, AND STORAGE MEDIUM FOR EVALUATING APPLICATION PROGRAM

CROSS-REFERENCE TO RELATED APPLICATION

This application is based upon and claims the benefit of priority from the prior Japanese Patent Application No. 2014-253769, filed on Dec. 16, 2014 and the prior Japanese Patent Application No. 2014-253770, filed on Dec. 16, 2014, the entire contents of which are incorporated herein by reference.

BACKGROUND

1. Field of the Invention

The present invention relates to evaluation technologies and particularly to an information processing apparatus, an evaluation method, and a storage medium for evaluating application programs.

2. Description of the Related Art

A variety of application programs are installed and used in electronic devices such as personal computers, smartphones, and the like. The form for distributing application programs is in the process of change from a form where files are recorded in a variety of recording media and distributed to a form where files are downloaded from a server via the Internet or the like. Application programs are distributed to many users for trial use in order for the users to find application programs with high utility value. For example, programs with limitations that are referred to as so-called "demonstration version" are distributed aside from the regular version for sale. In consideration of the convenience for the program providers and the users, it is preferred that the users use the regular version programs instead of the demonstration version (for example, see Patent Document 1).

[Patent Document 1] Japanese Patent Application Publication No. 2014-164392

When license authentication is required at the time of using an application program, the user purchases a regular version license so as to perform the authentication. On the other hand, there is a case where a trial license is issued free of charge for evaluation and testing purposes. In that case, the user purchases a regular version license after performing evaluation and testing of the application program using the trial license. There is also a case where the user requests the reissuance of the trial license so as to perform the evaluation and the testing using a reissued trial license when a trial period for the trial license is expired.

Limitations are set for a trial period, a cumulative trial period, and an activation count for the trial license. These parameters are monitored, and the application program is no longer able to be used when a value thereof exceeds a fixed value. However, under such limitations, a period for using the trial license may be expired before the user makes full use of the application program.

SUMMARY

An information processing apparatus according to one embodiment is an information processing apparatus in which a program of an application is installable, including: a detection unit that detects the activation of the program by the information processing apparatus; an acquisition unit that acquires, after the activation of the program is detected by the detection unit, the history of an operation performed on the application by a user; and a determination unit that determines, using as a parameter the history of the operation acquired by the acquisition unit, the termination of evaluation of the program of the application performed by the user.

Another embodiment relates to an evaluation method. This method is an evaluation method by a program of an application that is installable in a computer, including: detecting the activation of the program performed by the computer; acquiring, after the activation of the program is detected, the history of an operation performed on the application by a user; and determining, using as a parameter the history of the operation that has been acquired, the termination of evaluation of the program of the application performed by the user.

Still another embodiment also relates to an information processing apparatus. This apparatus is an information processing apparatus in which a program of an application is installable, includes: a detection unit that detects the activation of the program by the information processing apparatus; a first acquisition unit that acquires, after the activation of the program is detected by the detection unit, first history of an X-th time operation performed by a user for a scenario that is defined by the application and that consists of a plurality of functions; a second acquisition unit that acquires second history of a Y-th time operation (Y>X) performed by the user for the scenario; and a determination unit that determines the termination of evaluation of the program of the application performed by the user by comparing the first history acquired by the first acquisition unit with the second history acquired by the second acquisition unit.

Still another embodiment also relates to an evaluation method. This method is an evaluation method by a program of an application that is installable in a computer, including: detecting the activation of the program performed by the computer; acquiring, after the activation of the program is detected, first history of an X-th time operation performed by a user for a scenario that is defined by the application and that consists of a plurality of functions; acquiring second history of a Y-th time operation (Y>X) performed by the user for the scenario; and determining the termination of evaluation of the program of the application performed by the user by comparing the first history and the second history that have been acquired.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Examples will now be described, by way of example only, with reference to the accompanying drawings that are meant to be exemplary, not limiting, and wherein like elements are numbered alike in several figures, in which:

FIGS. 7A-7B are diagrams each illustrating the data structure of a database recorded by a determination unit according to a sixth example;

FIG. 9 is a diagram illustrating a data structure of a database recorded by a determination unit shown in FIG. 8;

FIG. 11 is a diagram illustrating a data structure of a database recorded by a determination unit according to an eighth example.

DETAILED DESCRIPTION

The invention will now be described by reference to the preferred examples. This does not intend to limit the scope of the present invention, but to exemplify the invention.

First Example

A brief description will be given first before a specific description thereof is given. A first example relates to the execution of an installed application program in an information processing apparatus such as a personal computer, a smartphone, a tablet, or the like. In this example, particularly a case is expected where the application program is executed using a trial license. In this case, although a trial period, the actual hours of use, the number of times, and the like are monitored, information regarding the actual user operation is not recorded or monitored thus far. The information regarding the actual user operation means information indicating, for example, whether all the functions of the application program are executed, whether the application program is fully used, or the like.

Therefore, the trial period can possibly be expired before the user fully evaluates the application program or before the user fully uses the application program. In this case, since the user is not able to fully evaluate the application program, the user requests the trial license again or purchases a regular version license for a fee without having a full evaluation. Receiving multiple requests for the trial license from the user, the manufacturer has to issue the trial license every time a request is made. In addition to spending time and effort for issuing the trial license multiple times, the trial license may be continuously used by the user permanently. In the present example, whether or not the user has finished the evaluation of the application program is evaluated in a quantitative way without depending on the trial period, the actual hours of use, or the number of times. In particular, the history of an operation performed by the user is used for quantitative evaluation.

Figure 1:
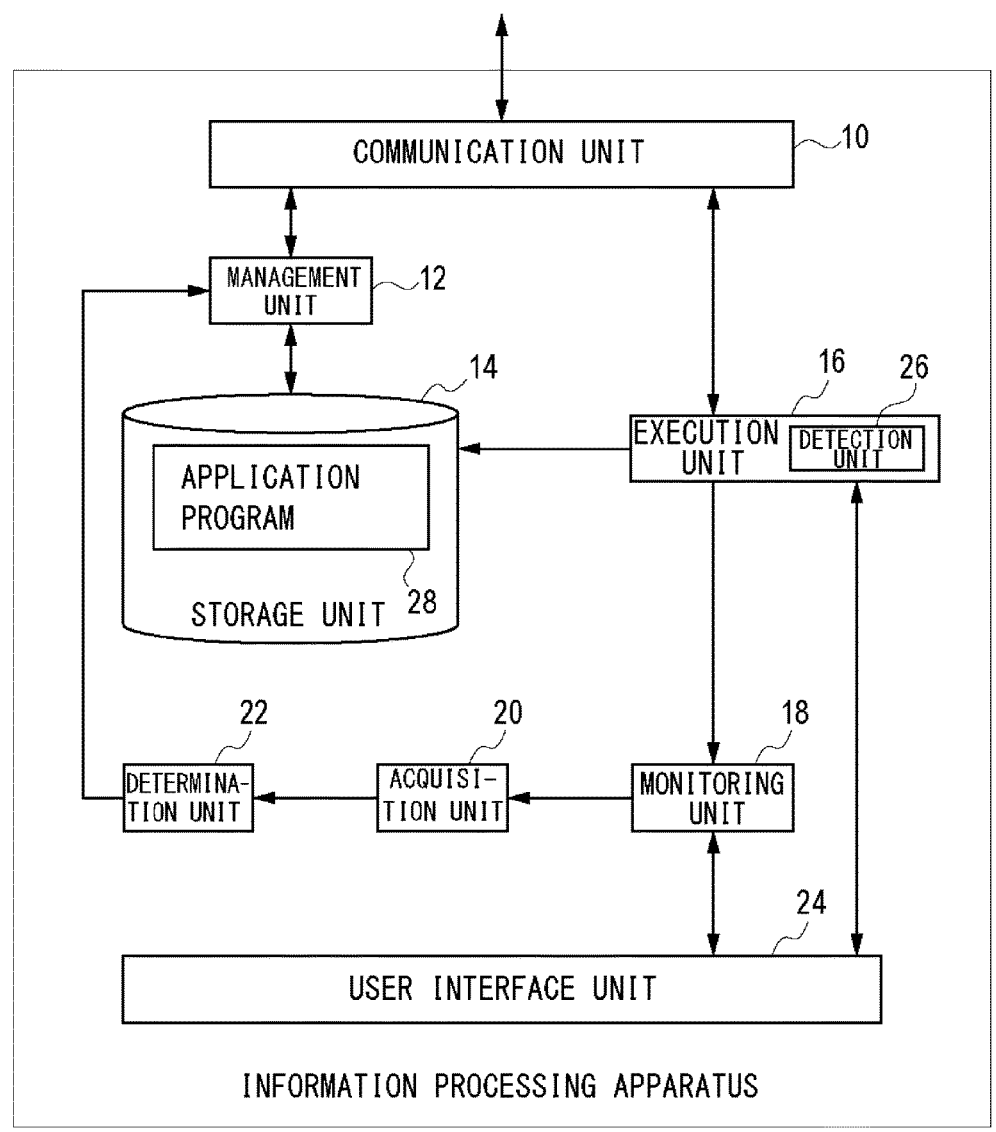
FIG. 1 is a diagram illustrating the configuration of an information processing apparatus according to a first example.

FIG. 1 illustrates the configuration of an information processing apparatus 100 according to a first example. The information processing apparatus 100 includes a communication unit 10, a management unit 12, a storage unit 14, an execution unit 16, a monitoring unit 18, an acquisition unit 20, a determination unit 22, and a user interface unit 24. The storage unit 14 stores an application program 28, and the execution unit 16 includes a detection unit 26.

The user interface unit 24 includes a button or the like that receives an instruction from the user and a monitor or the like that presents information to the user. The user interface unit 24 may be formed of a touch panel. The touch panel receives an instruction from the user and presents information to the user.

The communication unit 10 is connected to a network that is not shown. The network may be a wired network or a wireless network. The communication unit 10 is capable of accessing a server that is not shown via the network and is capable of downloading an application program from the server. Also, a trial license and a regular version license can be downloaded through the communication unit 10. Expected in this example is a case where the trial license is downloaded and the regular version license is not downloaded.

The management unit 12 installs the application program downloaded by the communication unit 10 in the storage unit 14. Using the trial license that has been downloaded by the communication unit 10, the management unit 12 performs an authentication process with the server. The authentication process is performed through the communication unit 10, and publicly-known technologies need to be used for the authentication process. Thus, the explanation thereof is omitted.

The storage unit 14 stores an application program 28. As an example, one application program 28 is stored. Alternatively, a plurality of application programs 28 may be stored. The application program 28 is a software program that performs a predetermined process, and the predetermined process may be arbitrary. It is assumed that the application program 28 is in a state where the application program 28 is operable within the scope of the trial license through the authentication process performed by the management unit 12.

The execution unit 16 executes the application program 28 stored in the storage unit 14. A plurality of functions for executing each of a plurality of scenarios defined by the application are implemented in the application program 28. A scenario is a series of operations for achieving a predetermined goal, for example, operations from the execution of an editing process on a file to printing by a printer. Such operations of a scenario consists of a plurality of processes such as copying an item, pasting the item, saving a file, and printing, and the plurality of processes included in the scenario are each implemented in the application program 28 as a function. Instead of all the operations that can be performed in the application program 28, the scenario defined in the application program 28 may represent a part of the operations.

Figure 2:
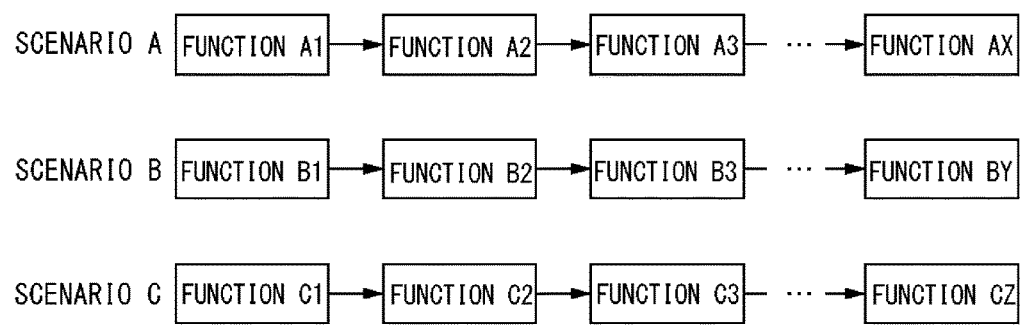
FIG. 2 is a diagram illustrating a scenario defined in an application program executed in the information processing apparatus shown in FIG. 1.

FIG. 2 illustrates a scenario defined in the application program 28 that is executed in the information processing apparatus 100. Three types of scenarios: "scenario A"; "scenario B"; and "scenario C", are shown as examples in the figure. However, scenarios defined in the application program 28 do not need to be of three types. In the scenario A, a function A1, a function A2, a function A3, . . . , a function AX are executed in chronological order. In the scenario B, a function B1, a function B2, a function B3, . . . , a function BY are executed in chronological order. In the scenario C, a function C1, a function C2, a function C3, . . . , a function CZ are executed in chronological order.

Functions that are shown separately may be the same functions. For example, the function A3 and the function B2 may be both "copy".

Also, when a plurality of functions included in each of the scenarios are executed, the contents of an operation received via the user interface unit 24, which are also the contents of an operation performed by the user, are already known to the application program 28. An operation for one function is not limited to include only one content and may include a plurality of contents. The application program 28 stores information regarding the contents of an operation to be received (hereinafter, referred to as "operation prediction information") in correspondence with each of the plurality of functions included in each of the scenarios shown in FIG. 2. When executing the application program 28 with a trial license, the execution unit 16 acquires operation prediction information from the application program 28. FIG. 1 is referred back.

The detection unit 26 detects the activation of the application program 28 by the execution unit 16. The detection unit 26 monitors a job executed by the execution unit 16 and detects the activation of the application program 28 at the time when the application program 28 is included in the job. Under a condition where the execution unit 16 executes the application program 28 and a screen thereof is displayed on the user interface unit 24, the monitoring unit 18 acquires an instruction entered by the user via the user interface unit 24, that is, the contents of the operation. The monitoring unit 18 outputs the contents of the operation that have been acquired to the acquisition unit 20.

The acquisition unit 20 receives the contents of the operation from the monitoring unit 18. The acquisition unit 20 generates the history of the operation (hereinafter, referred to as "operation history") by putting, in chronological order, the contents of the operation that have been received. In other words, after the activation of the application program 28 is detected by the detection unit 26, the acquisition unit 20 acquires the operation history performed by the user on the application program 28. The acquisition unit 20 receives the contents of an operation successively and thus updates the operation history successively so that the received contents are reflected. When the user operates according to the previously-stated scenario, the operation history includes the contents of an operation for each of the plurality of functions in order. Therefore, it can be considered that the acquisition unit 20 acquires information regarding execution termination for each of the plurality of functions. The acquisition unit 20 outputs the updated operation history to the determination unit 22.

The determination unit 22 receives the operation history successively from the acquisition unit 20. Also, the determination unit 22 receives operation prediction information from the execution unit 16 via the monitoring unit 18 and the acquisition unit 20. The determination unit 22 acknowledges the execution termination for each of the plurality of functions by mapping the contents of a plurality of operations included in the operation history to the contents of a plurality of operations included in the operation prediction information. Giving a detailed description, the determination unit 22 recognizes, by making the comparison with the operation prediction information, that an operation for the function A1, an operation for the function A2, and an operation for the function A3 are arranged in said order in the contents of the plurality of operations included in the operation history. When the determination unit 22 performs this kind of recognition, the determination unit 22 recognizes the execution termination of the function A1, the execution termination of the function A2, and the execution termination of the function A3. Another operation may be included between an operation for the function A1 and an operation for the function A2 that are included in the operation history. This corresponds to a case where the user performs an erroneous operation when executing the scenario A.

The determination unit 22 accumulates the number of functions for which execution termination is recognized. The determination unit 22 determines the termination of the evaluation when the number that is accumulated is larger than a threshold value. The threshold value may be the number of functions included in all the scenarios or may be smaller than the number. As described, the determination unit 22 determines, using the operation history as a parameter, the termination of the evaluation of the application program 28 performed by the user. When the termination is determined, the determination unit 22 sends a notification indicating that the termination is determined to the management unit 12. Upon receiving the notification from the determination unit 22, the management unit 12 stops the activation of the application program 28 performed by the trial license. The management unit 12 may prompt the user to purchase and enter a regular version license via the user interface unit 24 at that time. On the other hand, when the termination is not determined, the determination unit 22 continues to allow the application program 28 to operate by the trial license.

The configuration is implemented in hardware by any CPU of a computer, memory or other LSI's, and in software by a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

Figure 3:
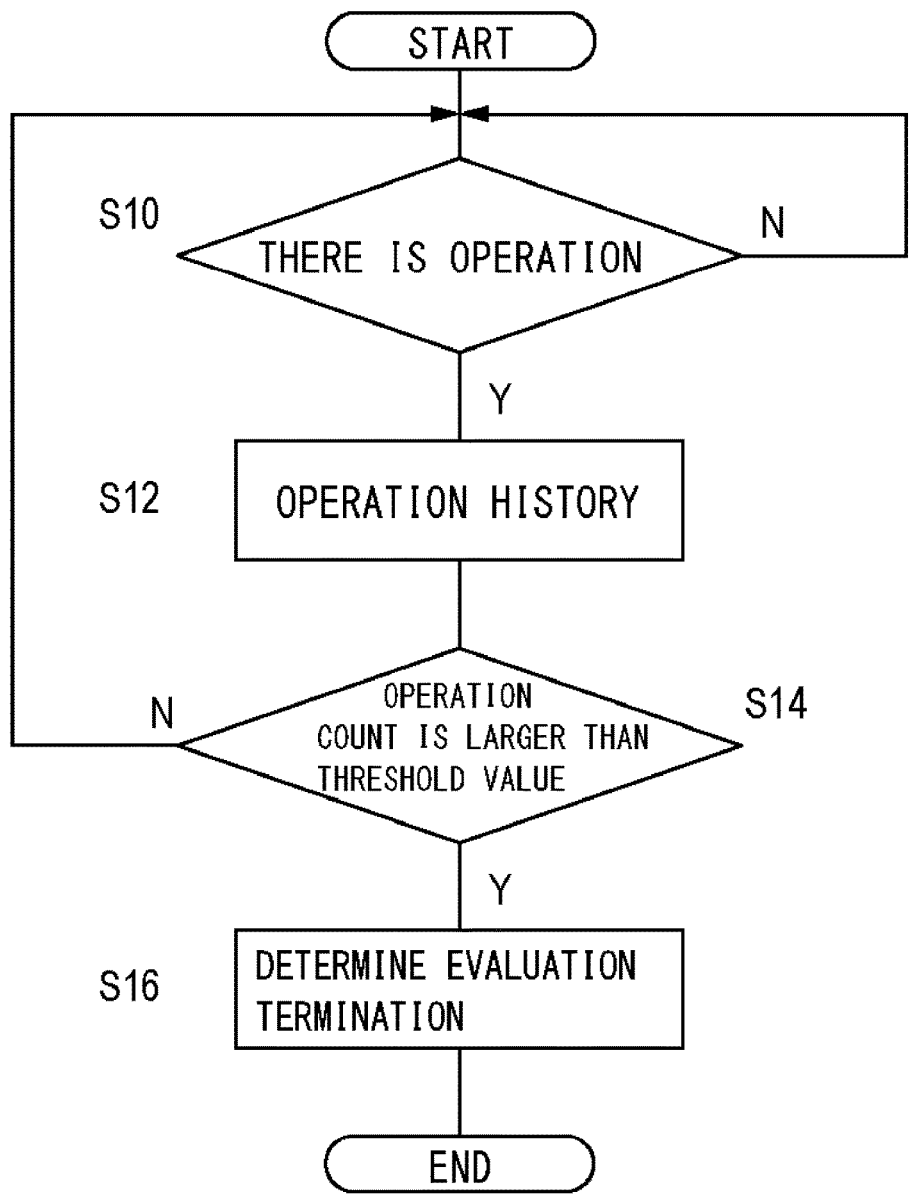
FIG. 3 is a flowchart illustrating a determination procedure performed by the information processing apparatus shown in FIG. 1.

An explanation will be given regarding the operation of the information processing apparatus 100 having the above-stated configuration. FIG. 3 is a flowchart illustrating a determination procedure performed by the information processing apparatus 100. If there is no operation in the monitoring unit 18 (N in S10), the information processing apparatus 100 is on stand-by. If there is an operation in the monitoring unit 18 (Y in S10), the acquisition unit 20 records operation history thereof (S12). If an operation count is not larger than a threshold value (N in S14), the step returns to Step 10. If the operation count is larger than the threshold value (Y in S14), the determination unit 22 determines evaluation termination (S16).

According to the present example, the termination of the evaluation of the application program performed by the user is determined using the history of operations after the activation of the application program as a parameter. Thus, the evaluation on the application program can be fully performed. Also, when the number of functions for which execution is terminated is larger than the threshold value, the termination of the evaluation is determined. Thus, the evaluation of the application program can be fully performed. Also, the user is able to use the trial license efficiently. Further, time and effort required for the manufacturer to issue and authenticate the license multiple times can be reduced. A case where the trial license is permanently used can be prevented from occurring.

Second Example

Subsequently, a second example will be described. As in the case in the first example, the second example relates to an information processing apparatus that executes an application program using a trial license. In the first example, the termination of the evaluation of an application program by the user is determined based on the number of functions that are executed. On the other hand, in the second example, the termination of the evaluation of an application program by the user is determined based on the number of screens that are displayed by the execution of the application program. An information processing apparatus 100 according to the second example is of the same type as the one shown in FIG. 1. Thus, an explanation will be given mainly regarding the differences.

Upon executing an application program 28, the execution unit 16 allows a corresponding screen to be displayed on a user interface unit 24. Screens may be mapped to the previously-described functions on a one-to-one basis. Alternately, a plurality of screens may be displayed for one function or one screen may be displayed for a plurality of functions.

Figure 4:
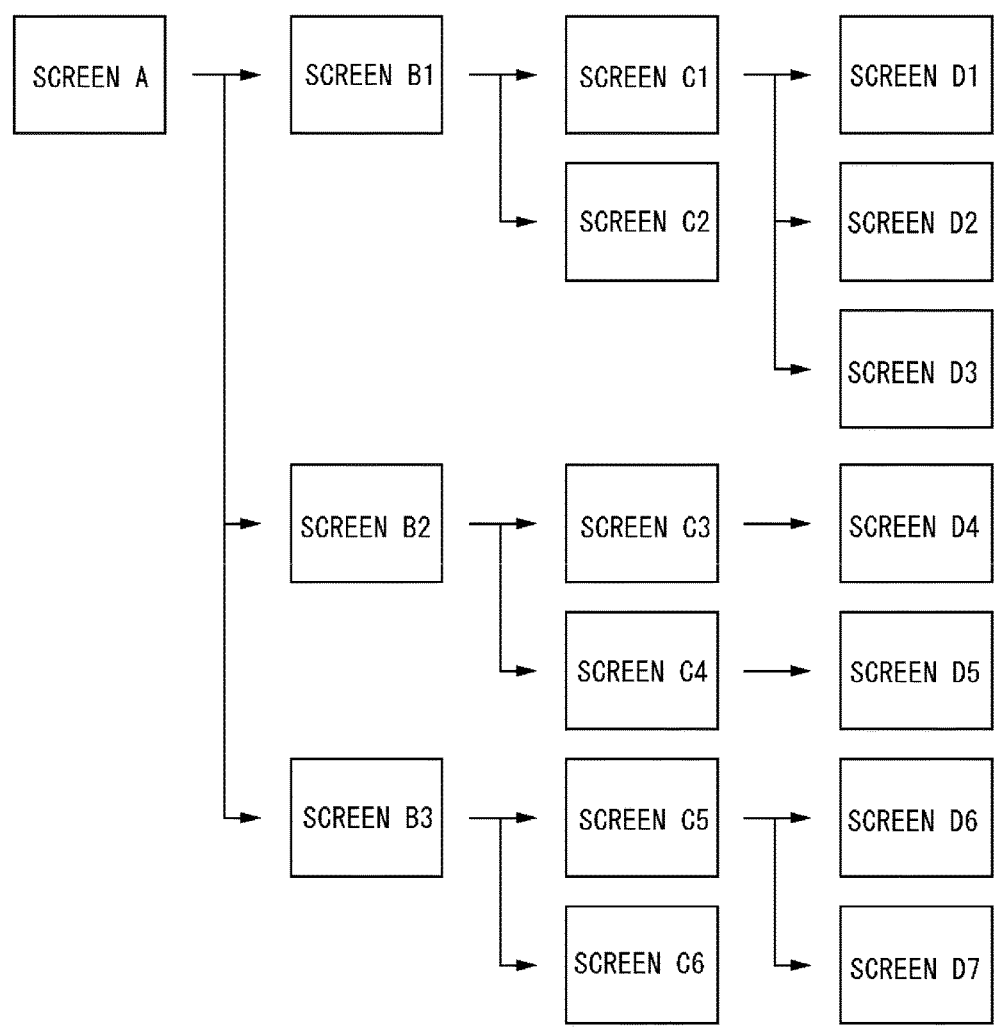
FIG. 4 is a diagram illustrating a screen transition defined in an application program executed in an information processing apparatus according to a second example.

FIG. 4 illustrates a screen transition defined in an application program executed in the information processing apparatus 100 according to the second example. In this figure, a "screen A" represents a screen in the highest layer. When the "screen A" is displayed, a transition is made from the "screen A" to any one of a "screen B1", a "screen B2", and a "screen B3" according to an instruction entered by the user to the user interface unit 24. Therefore, the "screen B1", the "screen B2", and the "screen B3" correspond to screens that are in a layer that is lower than that of the "screen A". A transition is also made in the same manner in a "screen C1", a "screen D1", and the like. As described, the application program 28 executed by the execution unit 16 is capable of displaying a plurality of screens on the user interface unit 24. The application program 28 stores information regarding a plurality of screens included in a screen transition shown in FIG. 4 (hereinafter, also referred to as "operation prediction information"). When executing the application program 28 with a trial license, the execution unit 16 acquires operation prediction information from the application program 28. FIG. 1 is referred back.

Under a condition where the execution unit 16 executes the application program 28 and a screen thereof is displayed on the user interface unit 24, the monitoring unit 18 acquires information regarding the screen that is displayed. The monitoring unit 18 outputs the information regarding the screen that have been acquired to the acquisition unit 20. The acquisition unit 20 receives the information regarding the screen from the monitoring unit 18. The acquisition unit 20 generates the history of the transition of the screen (hereinafter, referred to as "screen transition history") by putting, in chronological order, the information regarding the screen that has been received. In other words, after the activation of the application program 28 is detected by the detection unit 26, the acquisition unit 20 acquires screen transition history as operation history for the application program 28. The acquisition unit 20 receives information regarding a screen successively and thus updates the screen transition history successively so that the received information is reflected. The acquisition unit 20 outputs the updated screen transition history to the determination unit 22.

The determination unit 22 receives the screen transition history successively from the acquisition unit 20. Also, the determination unit 22 receives operation prediction information from the execution unit 16 via the monitoring unit 18 and the acquisition unit 20. The determination unit 22 acknowledges the execution termination for each of the plurality of screens by mapping information regarding a plurality of screens included in the screen transition history to the contents of information regarding a plurality of screens included in the operation prediction information. Giving a detailed description, the determination unit 22 recognizes, by making the comparison with the operation prediction information, that the information regarding the plurality of screens included in the screen prediction history indicates the screen A, the screen B1, the screen C1, and the screen D1. When the determination unit 22 performs this kind of recognition, the determination unit 22 recognizes the execution termination of the screen A, the screen B1, the screen C1, and the screen D1. The determination unit 22 accumulates the number of screens for which execution termination is recognized. The determination unit 22 determines the termination of the evaluation when the number that is accumulated is larger than a threshold value. The threshold value may be the number of all the screens or may be smaller than the number.

According to the present example, when the number of screens shown in the history of the transition of screens is larger than the threshold value, the termination of the evaluation is determined. Thus, the evaluation of the application program can be fully performed.

Third Example

Subsequently, a third example will be described. As in the case in the previous examples, the third example relates to an information processing apparatus that executes an application program using a trial license. In the second example, the termination of the evaluation of an application program by the user is determined based on the number of screens that are displayed by the execution of the application program. On the other hand, in the third example, the termination of the evaluation of an application program by the user is determined based on the number of selections of buttons arranged in each of a plurality of screens that are displayed by the execution of the application program. An information processing apparatus 100 according to the third example is of the same type as the one shown in FIG. 1. Thus, an explanation will be given mainly regarding the differences.

Figure 5A:
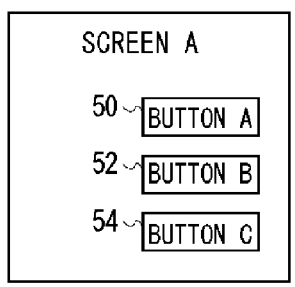
FIGS. 5A-5C are diagrams each illustrating a screen defined in an application program executed in an information processing apparatus according to a third example.
Figure 5B:
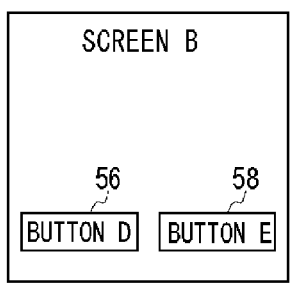
Figure 5C:
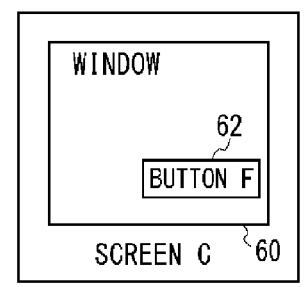

Upon executing an application program 28, the execution unit 16 allows a corresponding screen to be displayed on a user interface unit 24. In general, one or more buttons are arranged in each screen. FIGS. 5A-5C each illustrate a screen defined in an application program executed in the information processing apparatus 100 according to the third example. These screens may correspond to respective screens shown in FIG. 4. A button A50, a button B52, and a button C54 are arranged in a screen A shown in FIG. 5A. When the user selects any one of the button A50, the button B52, and the button C54 by the operation of the user interface unit 24, the execution unit 16 performs a process that corresponds to a button that is selected and allows a screen corresponding to the result of the process to be displayed on the user interface unit 24. A button D56 and a button E58 are arranged in a screen shown in FIG. 5B. As described, the number of buttons arranged in a screen may be an arbitrary number.

A window 60 is arranged in a screen C shown in FIG. 5C, and a button F62 is arranged in the window 60. As described, the application program 28 executed by the execution unit 16 is capable of displaying a plurality of screens in which one or more buttons are arranged on the user interface unit 24. The application program 28 stores information regarding a plurality of buttons included in each of a plurality of screens as shown in FIGS. 5A-5C (hereinafter, also referred to as "operation prediction information"). When executing the application program 28 with a trial license, the execution unit 16 acquires operation prediction information from the application program 28. FIG. 1 is referred back.

Under a condition where the execution unit 16 executes the application program 28 and a screen thereof is displayed on the user interface unit 24, the monitoring unit 18 acquires information regarding a button that is selected on the screen. The monitoring unit 18 outputs the information regarding the button that have been acquired to the acquisition unit 20. The acquisition unit 20 receives the information regarding the button from the monitoring unit 18. The acquisition unit 20 generates the history of the selection of a button (hereinafter, referred to as "button selection history") by putting, in order, the information regarding the button that has been received. In other words, after the activation of the application program 28 is detected by the detection unit 26, the acquisition unit 20 acquires button selection history as operation history for the application program 28. The acquisition unit 20 receives information regarding a button successively and thus updates the button selection history successively so that the received information is reflected. The acquisition unit 20 outputs the updated button selection history to the determination unit 22.

The determination unit 22 receives the button selection history successively from the acquisition unit 20. Also, the determination unit 22 receives operation prediction information from the execution unit 16 via the monitoring unit 18 and the acquisition unit 20. The determination unit 22 acknowledges the execution termination for each of the plurality of buttons by mapping information regarding a plurality of buttons included in the button selection history to the contents of information regarding a plurality of buttons included in the operation prediction information. Giving a detailed description, the determination unit 22 recognizes, by making the comparison with the operation prediction information, a selected button based on the information regarding the plurality of buttons included in the button selection history. When the determination unit 22 performs this kind of recognition, the determination unit 22 recognizes the execution termination for the selected button. The determination unit 22 accumulates the number of buttons for which execution termination is recognized. The determination unit 22 determines the termination of the evaluation when the number that is accumulated is larger than a threshold value. The threshold value may be the number of all the buttons or may be smaller than the number.

According to the present example, when the number of buttons shown in the history of the selection of the buttons is larger than the threshold value, the termination of the evaluation is determined. Thus, the evaluation of the application program can be fully performed.

Fourth Example

Subsequently, a fourth example will be described. As in the case in the previous examples, the fourth example relates to an information processing apparatus that executes an application program using a trial license. In the previous examples, an application program is processed by a graphical user interface (GUI), and the termination of the evaluation of the application program by the user is determined based on a screen that is displayed, the number of buttons, and the like. On the other hand, in the fourth example, an application program is executed by the entry of a command, and the termination of the evaluation of the application program by the user is determined based on the number of commands that are entered. An information processing apparatus 100 according to the fourth example is of the same type as the one shown in FIG. 1. Thus, an explanation will be given mainly regarding the differences.

A user interface unit 24 receives a command from the user. The execution unit 16 executes an application program 28 in accordance with the command that has been received. A plurality of commands that can be received by the application program 28 are defined. The application program 28 stores information regarding the plurality of commands that can be received (hereinafter, also referred to as "operation prediction information"). When executing the application program 28 with a trial license, the execution unit 16 acquires operation prediction information from the application program 28.

The execution unit 16 executes the application program 28 and receives a command through the user interface unit 24, and the monitoring unit 18 acquires information regarding the command. The monitoring unit 18 outputs the information regarding the command that have been acquired to the acquisition unit 20. The acquisition unit 20 receives the information regarding the command from the monitoring unit 18. The acquisition unit 20 generates the history of the reception of a command (hereinafter, referred to as "command reception history") by putting, in order, the information regarding the command that has been received. In other words, after the activation of the application program 28 is detected by the detection unit 26, the acquisition unit 20 acquires command reception history as operation history for the application program 28. The acquisition unit 20 receives information regarding a command successively and thus updates the command reception history successively so that the received information is reflected. The acquisition unit 20 outputs the updated command reception history to the determination unit 22.

The determination unit 22 receives the command reception history successively from the acquisition unit 20. Also, the determination unit 22 receives operation prediction information from the execution unit 16 via the monitoring unit 18 and the acquisition unit 20. The determination unit 22 acknowledges the execution termination for each of the plurality of commands by mapping information regarding a plurality of commands included in the command reception history to the contents of information regarding a plurality of commands included in the operation prediction information. The determination unit 22 accumulates the number of commands for which execution termination is recognized. The determination unit 22 determines evaluation termination when the number that is accumulated is larger than a threshold value. The threshold value may be the number of all the commands or may be smaller than the number.

According to the present example, when the number of commands shown in the history of the reception of the commands is larger than the threshold value, the termination of the evaluation is determined. Thus, the evaluation of the application program can be fully performed.

Fifth Example

Subsequently, a fifth example will be described. As in the case in the previous examples, the fifth example relates to an information processing apparatus that executes an application program using a trial license. In the third example, the termination of the evaluation of an application program by the user is determined based on the number of selections of buttons arranged in each of a plurality of screens that are displayed by the execution of the application program. On the other hand, in the fifth example, the termination of the evaluation of an application program by the user is determined based on the number of drag-and-drop operations performed in the application program. An information processing apparatus 100 according to the fifth example is of the same type as the one shown in FIG. 1. Thus, an explanation will be given mainly regarding the differences.

Figure 6:
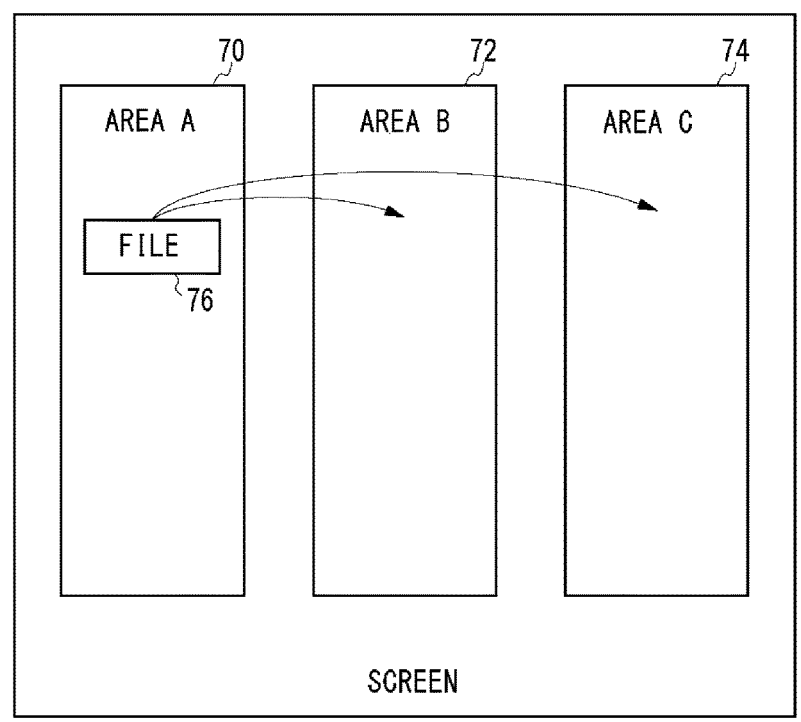
FIG. 6 is a diagram illustrating a screen on which dragging and dropping of a file defined in an application program executed in an information processing apparatus according to a fifth example are performed.

Upon executing an application program 28, the execution unit 16 allows a corresponding screen to be displayed on a user interface unit 24. On the screen, a plurality of drag-and-drop operations for a file can be performed. FIG. 6 illustrates a screen on which dragging and dropping of a file defined in an application program executed in the information processing apparatus 100 according to the fifth example are performed. An area A70, an area B72, and an area C74 are provided in the screen. A drag-and-drop operation of a file 76 from the area A70 to the area B72 is performed by the operation of the user interface unit 24 by the user. A drag-and-drop operation of the file 76 from the area A70 to the area C74 is also performed by the operation of the user interface unit 24 by the user.

Further, a drag-and-drop operation in a direction different from these operations may be performed for the file 76 between the area A70, the area B72, and the area C74. As described, the application program 28 executed by the execution unit 16 is capable of performing a plurality of drag-and-drop operations. The application program 28 stores information regarding a plurality of drag-and-drop operations as shown in FIG. 6 (hereinafter, also referred to as "operation prediction information"). When executing the application program 28 with a trial license, the execution unit 16 acquires operation prediction information from the application program 28. FIG. 1 is referred back.

Under a condition where the execution unit 16 executes the application program 28 and a screen thereof is displayed on the user interface unit 24, the monitoring unit 18 acquires information regarding a drag-and-drop operation for the file 76 that is performed on the screen. The monitoring unit 18 outputs the information regarding the drag-and-drop operation that have been acquired to the acquisition unit 20. The acquisition unit 20 receives the information regarding the drag-and-drop operation from the monitoring unit 18. The acquisition unit 20 generates the history of the execution of dragging and dropping (hereinafter, referred to as "drag-and-drop operation history") by putting, in order, the information regarding the drag-and-drop operation that has been received.

In other words, after the activation of the application program 28 is detected by the detection unit 26, the acquisition unit 20 acquires drag-and-drop operation history as operation history for the application program 28. The acquisition unit 20 receives information regarding a drag-and-drop operation successively and thus updates the drag-and-drop operation history successively so that the received information is reflected. The acquisition unit 20 outputs the updated drag-and-drop operation history to the determination unit 22.

The determination unit 22 receives the drag-and-drop operation history successively from the acquisition unit 20. Also, the determination unit 22 receives operation prediction information from the execution unit 16 via the monitoring unit 18 and the acquisition unit 20. The determination unit 22 acknowledges the execution termination for each of the plurality of drag-and-drop operations by mapping information regarding a plurality of drag-and-drop operations included in the drag-and-drop operation history to the contents of information regarding a plurality of drag-and-drop operations included in the operation prediction information. Giving a detailed description, the determination unit 22 recognizes, by making the comparison with the operation prediction information, dragging and dropping that has been operated based on the information regarding the plurality of drag-and-drop operations included in the drag-and-drop operation history. When the determination unit 22 performs this kind of recognition, the determination unit 22 recognizes the execution termination for the drag-and-drop operation. The determination unit 22 accumulates the number of drag-and-drop operations for which execution termination is recognized. The determination unit 22 determines the termination of the evaluation when the number that is accumulated is larger than a threshold value. The threshold value may be the number of all the drag-and-drop operations or may be smaller than the number.

According to the present example, when the number of drag-and-drop operations shown in the history of the execution of dragging and dropping is larger than the threshold value, the termination of the evaluation is determined. Thus, the evaluation of the application program can be fully performed.

Sixth Example

Subsequently, a sixth example will be described. As in the case in the previous examples, the sixth example relates to an information processing apparatus that executes an application program using a trial license. Explanations are given thus far regarding parameters for determining the termination of the evaluation of an application program. For example, set as the respective parameters in the first example, the second example, the third example, the fourth example, and the fifth example are a function, a screen, a button, a command, and a drag-and-drop operation, respectively. In the sixth example, a combination of these is used as a parameter. An information processing apparatus 100 according to the sixth example is of the same type as the one shown in FIG. 1. Thus, an explanation will be given mainly regarding the differences.

The acquisition unit 20 acquires pieces of information that has been acquired in the previous examples and outputs the pieces of information (hereinafter, referred to as "operation history") to the determination unit 22. The determination unit 22 receives the operation history successively from the acquisition unit 20. Also, the determination unit 22 receives operation prediction information from the execution unit 16 via the monitoring unit 18 and the acquisition unit 20. In this operation prediction information, information included in the pieces of operation prediction information explained in the previous examples is complied. An explanation will be given, using FIGS. 7A-7B, regarding the information included in the operation prediction information. FIGS. 7A-7B each illustrate the data structure of a database recorded in a determination unit 22 according to the sixth example. FIG. 7A shows data in which counts for the number of times a button operation, a mouse operation, a screen transition, and a command operation are made for each of the functions in the first example are collected. The count of drag-and-drop operations may be also included. An explanation regarding FIG. 7B will be given later. FIG. 1 is referred back. The determination unit 22 accumulates the number of functions for which the total value of the respective counts of the plurality of types of operations is larger than a first threshold value. The determination unit 22 determines the termination of the evaluation when the number that is accumulated is larger than a second threshold value.

FIG. 7B shows data in which counts for the number of times an button operation, a mouse operation, a screen transition, and a command operation are made for each of the screens in the second example are collected. The count of drag-and-drop operations may be also included in this data. FIG. 1 is referred back. The determination unit 22 accumulates the number of screens for which the total value of the respective counts of the plurality of types of operations is larger than the first threshold value. The determination unit 22 determines the termination of the evaluation when the number that is accumulated is larger than the second threshold value.

According to the present example, two or more of a function, a screen, a button, a command, and a drag-and-drop operation are combined so as to determine the termination of the evaluation. Thus, the evaluation of the application program can be fully performed.

Seventh Example

Subsequently, a seventh example will be described. As in the case in the previous examples, the seventh example relates to an information processing apparatus that executes an application program using a trial license. In the previous examples, the termination of the evaluation of an application program is determined based on operation history. On the other hand, in the seventh example, a proficiency level according to the contents of a job performed by the user is checked, and the evaluation of an application program is determined to be terminated when the proficiency level is high. Giving a detailed description, the information processing apparatus measures and records the time required for a first-time job when the user starts the application program.

The time required for a job means, for example, the speed and timing of a touch panel operation and keyboard entry, the speed of finding a necessary function by a screen transition or the like, and a time interval for performing a certain operation from another operation. The information processing apparatus continues such measurement even when the application program is activated next time or later. When the time required for a job is clearly shorter than the time required at the first time, the information processing apparatus determines that the proficiency level of the user has become higher and determines the termination of the evaluation of the application program.

Figure 8:
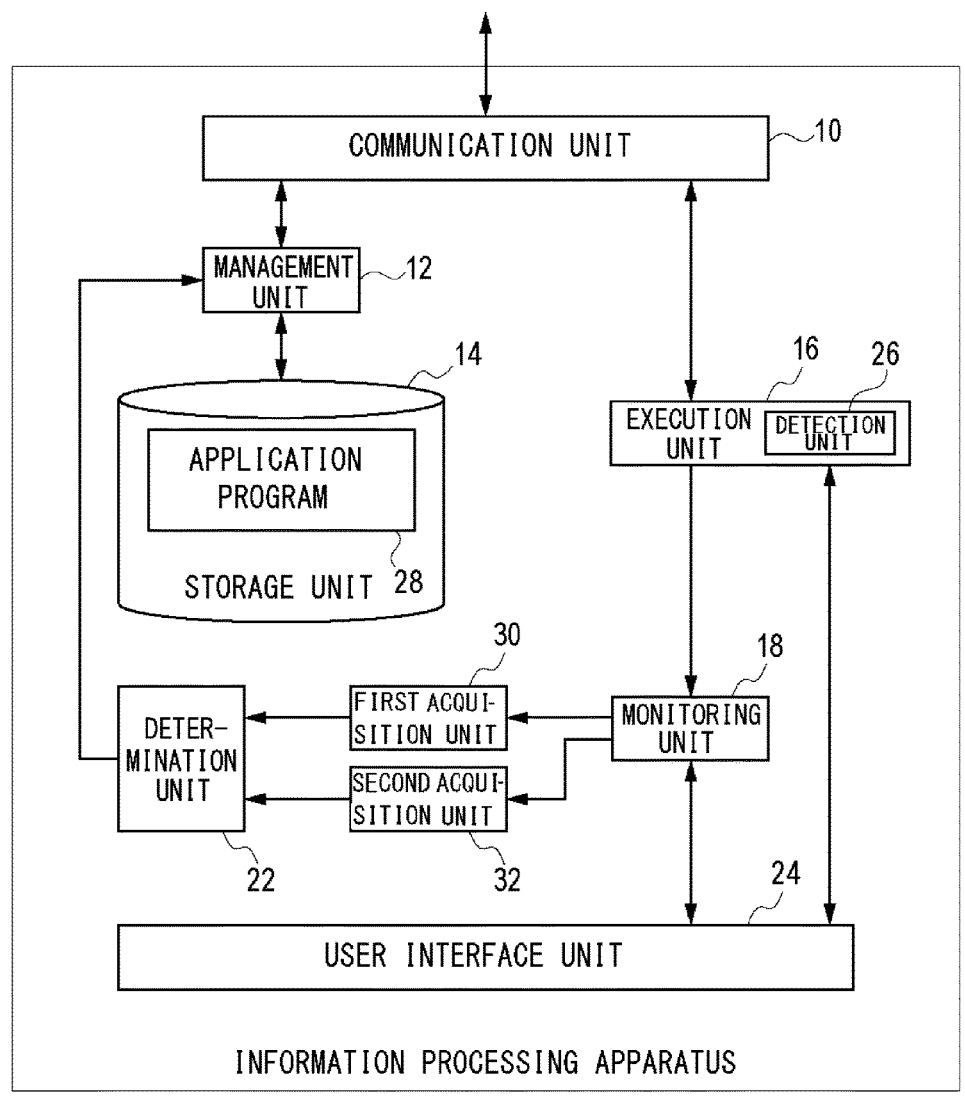
FIG. 8 is a diagram illustrating the configuration of an information processing apparatus according to a seventh example.

FIG. 8 illustrates the configuration of an information processing apparatus 100 according to the seventh example. The information processing apparatus 100 includes a communication unit 10, a management unit 12, a storage unit 14, an execution unit 16, a monitoring unit 18, a first acquisition unit 30, a second acquisition unit 32, a determination unit 22, and a user interface unit 24. The storage unit 14 stores an application program 28, and the execution unit 16 includes a detection unit 26.

The execution unit 16 executes the application program 28 stored in the storage unit 14. A plurality of functions for executing each of a plurality of scenarios are implemented in the application program 28, as described previously. The application program 28 stores operation prediction information, and this operation prediction information is information regarding the contents of an operation to be received in correspondence with each of the plurality of functions included in each of the scenarios, as described previously. When executing the application program 28 with a trial license, the execution unit 16 acquires operation prediction information from the application program 28.

The detection unit 26 detects the activation of the application program 28 by the execution unit 16. Under a condition where the execution unit 16 executes the application program 28 and a screen thereof is displayed on the user interface unit 24, the monitoring unit 18 acquires the contents of an operation performed by the user. The monitoring unit 18 outputs the contents of the operation that have been acquired to the first acquisition unit 30 and the second acquisition unit 32.

After the activation of the application program 28 is detected by the detection unit 26, the first acquisition unit 30 receives the contents of the operation from the monitoring unit 18. The first acquisition unit 30 receives operation prediction information from the execution unit 16 via the monitoring unit 18. The first acquisition unit 30 determines whether the contents of the operation that have been received follow the previously-stated scenario by comparing the contents of an operation included in the operation prediction information with the contents of the operation that have been received from the monitoring unit 18. When the contents follow the scenario for an X-th time, for example, for the first time, the first acquisition unit 30 generates the history of the operation (hereinafter, referred to as "first operation history") by putting, in chronological order, the contents of the operation that have been received. The first acquisition unit 30 receives the contents of an operation successively and thus updates the first operation history successively so that the received contents are reflected.

Therefore, the first operation history is considered to be the history of a first-time operation performed by the user for a scenario that is defined by the application program 28 and that consists of a plurality of functions. Further, the first acquisition unit 30 measures a first period during which a first-time scenario is executed, that is, from the start to the end of an operation for each scenario. The first acquisition unit 30 includes the first period in a first operation history. The first acquisition unit 30 outputs the first operation history to the determination unit 22.

The second acquisition unit 32 receives the contents of an operation from the monitoring unit 18 and also receives operation prediction information from the execution unit 16 via the monitoring unit 18. The second acquisition unit 32 determines whether the contents of the operation follow the previously-stated scenario, in the same way as in the first acquisition unit 30, based on the contents of the operation that have been received and the operation prediction information. When the contents follow the scenario for a Y-th time (Y>X), for example, for the tenth time, the second acquisition unit 32 generates the history of the operation (hereinafter, referred to as "second operation history") by putting, in chronological order, the contents of the operation that have been received. Note that Y is not limited to "10" and that X is not limited to "1". In other words, Y just needs to be larger than X.

Therefore, the second operation history is considered to be the history of a tenth-time operation performed by the user for a scenario that is defined by the application program 28 and that consists of a plurality of functions. Further, the second acquisition unit 32 measures a second period during which a tenth-time scenario is executed. The second acquisition unit 32 includes the second period in a second operation history. The second acquisition unit 32 outputs the second operation history to the determination unit 22.

The determination unit 22 receives the first operation history from the first acquisition unit 30 and also receives the second operation history from the second acquisition unit 32. The determination unit 22 records the first operation history and the second operation history in a database. FIG. 9 illustrates a data structure of the database recorded by the determination unit 22. The figure shows a first-time operation period and a tenth-time operation period for a plurality of scenarios: a scenario A; a scenario B; and a scenario C. The first-time operation period corresponds to the first period and is thus included in the first operation history. On the other hand, the tenth-time operation period corresponds to the second period and is thus included in the second operation history. FIG. 8 is referred back.

The determination unit 22 compares the first period and the second period for each of the scenarios. When the second period is shorter than the first period and the difference between the first period and the second period is a threshold value or more for a certain number or more of scenarios, the determination unit 22 determines the termination of the evaluation of the application program 28 performed by the user. The certain number may be the number of all the scenarios or may be smaller than the number. As described, the determination unit 22 determines, by comparing the first operation history with the second operation history, the termination of the evaluation of the application program 28 performed by the user. When the second period is not shorter than the first period or when the difference between the first period and the second period is not a threshold value or more, the second acquisition unit 32 and the determination unit 22 set Y to be a value that is larger than "10", for example, "11" and repeat the same processes described thus far. Such a change in Y is repeated until the determination unit 22 determines the termination of the evaluation.

Figure 10:
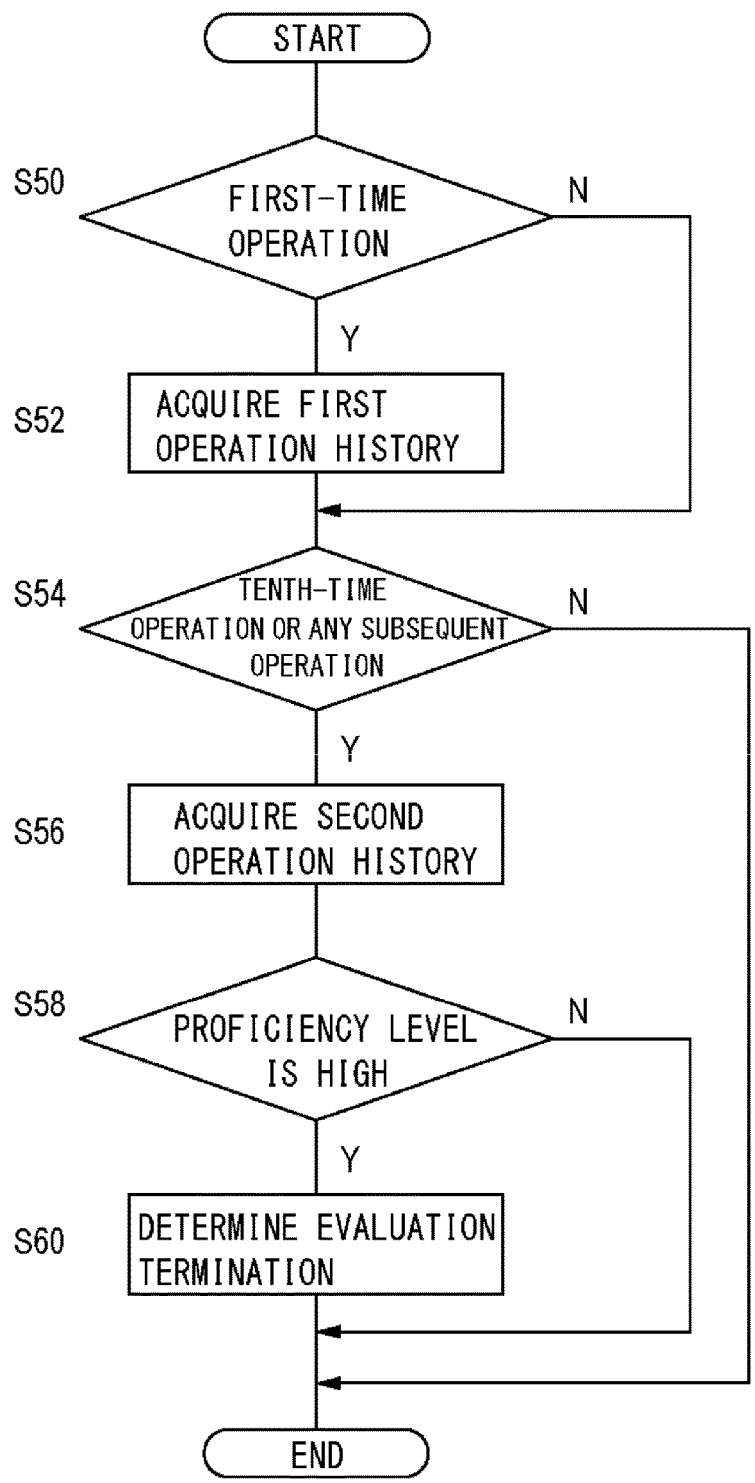
FIG. 10 is a flowchart illustrating a determination procedure performed by the information processing apparatus shown in FIG. 8.

FIG. 10 is a flowchart illustrating a determination procedure performed by the information processing apparatus 100. If the operation is a first-time operation (Y in S50), the first acquisition unit 30 acquires the first operation history (S52). If the operation is not a first-time operation (N in S50), the step 52 is skipped. If the operation is a tenth-time operation or any subsequent operation (Y in S54), the second acquisition unit 32 acquires the second operation history (S56). If the proficiency level is high (Y in S58), the determination unit 22 determines evaluation termination (S60). If the proficiency level is not high (N in S58), the step 60 is skipped. If the operation is not a tenth-time operation or any subsequent operation (N in S54), the step 56 through the step 60 are skipped.

According to the present example, the termination of the evaluation of an application program performed by the user is determined by comparing a first history of an X-th time operation for a scenario by the user to a second history of a Y-th time operation (Y>X) for the scenario by the user. Thus, the evaluation on the application program can be fully performed. When a second period during which a Y-th time scenario is executed is shorter than a first period during which an X-th time scenario is executed and the difference between the first period and the second period is a threshold value or more, the termination of the evaluation of an application program performed by the user is determined. Thus, the evaluation on the application program can be fully performed.

Eighth Example

Subsequently, an eighth example will be described. In the eighth example, regarding an information processing apparatus that executes an application program while using a trial license, a proficiency level according to the contents of a job performed by the user is checked, and the evaluation of the application program is determined to be terminated when the proficiency level is high, in the same way as in the seventh example. In the seventh example, the proficiency level is derived based on the time required for the job. On the other hand, the proficiency level is derived based on the number of erroneous operations in the eighth example. An information processing apparatus 100 according to the eighth example is of the same type as the one shown in FIG. 1. Thus, an explanation will be given mainly regarding the differences.

After the activation of an application program 28 is detected by the detection unit 26, the first acquisition unit 30 receives the contents of an operation from the monitoring unit 18 and also receives operation prediction information from the execution unit 16 via the monitoring unit 18. The first acquisition unit 30 generates a first operation history, as described previously. Further, the first acquisition unit 30 acquires the first number of erroneous operations generated during the execution of an X-th time scenario, for example, a first-time scenario, in other words, during a period from the start of an operation for each scenario to the end. The erroneous operations include the display of a warning message. The first acquisition unit 30 includes the first number in the first operation history. The first acquisition unit 30 outputs the first operation history to the determination unit 22.

The second acquisition unit 32 receives the contents of an operation from the monitoring unit 18 and also receives operation prediction information from the execution unit 16 via the monitoring unit 18. The second acquisition unit 32 generates a second operation history, as described previously. Further, the second acquisition unit 32 acquires the second number of erroneous operations generated during the execution of a Y-th time scenario, for example, a tenth-time scenario. The second acquisition unit 32 includes the second number in the second operation history. The second acquisition unit 32 outputs the second operation history to the determination unit 22.

The determination unit 22 receives the first operation history from the first acquisition unit 30 and also receives the second operation history from the second acquisition unit 32. The determination unit 22 records the first operation history and the second operation history in a database. FIG. 11 illustrates a data structure of a database recorded in a determination unit 22 according to the eighth example. The figure shows a first-time erroneous operation count and a tenth-time erroneous operation count for a plurality of scenarios: a scenario A; a scenario B; and a scenario C. The first-time erroneous operation count corresponds to the first number and is thus included in the first operation history. On the other hand, the tenth-time erroneous operation count corresponds to the second number and is thus included in the second operation history. FIG. 8 is referred back.

The determination unit 22 compares the first number and the second number for each of the scenarios. When the second number is smaller than the first number and the difference between the first number and the second number is a threshold value or more for a certain number or more of scenarios, the determination unit 22 determines the termination of the evaluation of the application program 28 performed by the user. The certain number may be the number of all the scenarios or may be smaller than the number. As described, the determination unit 22 determines, by comparing the first operation history with the second operation history, the termination of the evaluation of the application program 28 performed by the user.

According to the present example, when the second number of erroneous operations generated during the execution of a Y-th time scenario is smaller than the first number of erroneous operations generated during the execution of an X-th time scenario and the difference between the first number and the second number is a threshold value or more, the termination of the evaluation of an application program performed by the user is determined. Thus, the evaluation on the application program can be fully performed.

Described above is an explanation based on the exemplary examples of the present invention. These examples are intended to be illustrative only, and it will be obvious to those skilled in the art that various modifications to constituting elements and processes could be developed and that such modifications are also within the scope of the present invention.

In the first example, the determination unit 22 determines the termination of the evaluation based on the number of functions for which execution termination is recognized. However, the example given is non-limiting. For example, the determination unit 22 may determine the termination of the evaluation based on a score that is based on a function for which execution termination is recognized. Giving a detailed description, the score is set such that the score of a function arranged in the latter part of a scenario is larger than the score of a function arranged in the former part of the scenario. The determination unit 22 calculates the cumulative value of the score by adding a score for a function that has been executed. The determination unit 22 determines the termination of the evaluation when the cumulative value of the score is larger than a threshold value. According to this variation, as a function is arranged closer to the end of a scenario, the score of the function is set to be higher. Thus, the evaluation of the application program can be fully performed.

In the second example, the determination unit 22 determines the termination of the evaluation based on the number of screens that are displayed. However, the example given is non-limiting. For example, the determination unit 22 may determine the termination of the evaluation based on a score that is based on a screen that is displayed. Giving a detailed description, the score is set such that the score of a screen arranged in the latter part of a screen transition is larger than the score of a screen arranged in the former part of the screen transition. The determination unit 22 calculates the cumulative value of the score by adding a score for a screen that is displayed. The determination unit 22 determines the termination of the evaluation when the cumulative value of the score is larger than a threshold value. According to this variation, as a screen is arranged closer to the end of a screen transition, the score of the screen is set to be higher. Thus, the evaluation of the application program can be fully performed.

In the first example through the eighth example, evaluation is made on a single application program 28. However, the examples are not limited to this example. For example, a means for setting the evaluation for a plurality of users may be provided. The purpose of this is to allow a plurality of users to test and evaluate an application program 28. Therefore, an information processing apparatus 100 has functions for identifying a user such as user registration, fingerprint authentication, face authentication by a camera, and the like and measures and records data on a user-by-user basis. According to this variation, a proficiency level is recorded and managed on a user-by-user basis, and a trial license can thus be shared by a plurality of users.

What is claimed is:

1. An information processing apparatus, comprising a CPU and a memory, the memory storing an application program with a trial license, the memory storing instructions executable by the CPU, the instructions operable to cause the CPU to:
   execute the application program with the trial license;
   acquire a first operation history that is a chronological arrangement of a plurality of operations started to be entered by a user at a first point of time to execute a predetermined function provided in the application program;
   acquire a second operation history that is a chronological arrangement of a plurality of operations started to be entered by a user at a second point of time to execute the predetermined function, the second point of time being later than the first point of time;
   calculate a first period of time required for the user to complete an operation by referring to the first operation history;
   calculate a second period of time required for the user to complete an operation by referring to the second operation history; and
   determine termination of usage of the application program when the second period of time is shorter than the first period of time, thereby terminating the trial license of the application program.

2. The information processing apparatus according to claim 1, wherein the instructions are further operable to cause the CPU to:
   store a scenario including a plurality of functions provided in the application program and required to be executed to achieve a predetermine goal, and indicating an order of execution of the functions;
   acquire a first history of operations performed by the user to execute the plurality of functions included in the scenario as a first operation history; and
   acquire a second history of operations performed by the user to execute the plurality of functions included in the scenario as a second operation history.

3. The information processing apparatus according to claim 2, wherein the instructions are further operable to cause the CPU to:
   store a plurality of scenarios in the memory;
   calculate the first period of time and the second period of time for each of the plurality of scenarios stored in the memory; and
   determine termination of usage of the application program based on the number of scenarios for which the second period of time is shorter than the first period of time and a difference between the first period of time and the second period of time is equal to or larger than a fifth threshold value.

4. An information processing apparatus, comprising a CPU and a memory, the memory storing an application program with a trial license, the memory storing instructions executable by the CPU, the instructions operable to cause the CPU to:
   acquire a scenario including a plurality of functions provided in the application program and required to be executed to achieve a predetermine goal, and indicating an order of execution of the functions;

execute the application program with the trial license;
acquire a first operation history that is a chronological arrangement of a plurality of operations started to be entered by a user at a first point of time to achieve the predetermined goal;
acquire a second operation history that is a chronological arrangement of a plurality of operations started to be entered by a user at a second point of time to achieve the predetermined goal, the second point of time being later than the first point of time;
identify an operation in the first operation history that does not meet the scenario as an erroneous operation;
calculate a first erroneous operation count by counting the number of times of the erroneous operations identified;
identify an operation in the second operation history that does not meet the scenario as an erroneous operation;
calculate a second erroneous operation count by counting the number of times of the erroneous operations identified; and
determine termination of usage of the application program when the second erroneous operation count is smaller than the first erroneous operation count, thereby terminating the trial license of the application program.

5. The information processing apparatus according to claim 4, wherein the instructions are further operable to cause the CPU to:
store a plurality of scenarios in the memory;
calculate the first erroneous operation count and the second erroneous operation count for each of the plurality of scenarios stored in the memory; and
determine termination of usage of the application program based on the number of scenarios for which the second erroneous operation count is smaller than the first erroneous operation count and a difference between the first erroneous operation count and second erroneous operation count is equal to or larger than a sixth threshold value.

6. A non-transitory computer-readable storage medium having embodied thereon an application program with a trial license, comprising executable instructions operable to cause a CPU to:
execute the application program with the trial license;
acquire a first operation history that is a chronological arrangement of a plurality of operations started to be entered by a user at a first point of time to execute a predetermined function provided in the application program;
acquire a second operation history that is a chronological arrangement of a plurality of operations started to be entered by the user at a second point of time to execute the predetermined function, the second point of time being later than the first point of time;
calculate a first period of time required for the user to complete an operation by referring to the first operation history;
calculate a second period of time required for the user to complete an operation by referring to the second operation history; and
determine termination of usage of the application program when the second period of time is shorter than the first period of time, thereby terminating the trial license of the application program.

7. A non-transitory computer-readable storage medium having embodied thereon an application program with a trial license, comprising executable instructions operable to cause a CPU to:
execute the application program with the trial license;
acquire a scenario including a plurality of functions provided in the application program and required to be executed to achieve a predetermine goal and indicating an order of execution of the functions;
acquire a first operation history that is a chronological arrangement of a plurality of operations started to be entered by a user at a first point of time to achieve the goal;
acquire a second operation history that is a chronological arrangement of a plurality of operations started to be entered by the user at a second point of time to achieve the goal, the second point of time being later than the first point of time;
identify an operation in the first operation history that does not meet the scenario as an erroneous operation;
calculate a first erroneous operation count by counting the number of times of the erroneous operations identified;
identify an operation in the second operation history that does not meet the scenario as an erroneous operation;
calculate a second erroneous operation count by counting the number of times of the erroneous operations identified; and
determine termination of usage of the application program when the second erroneous operation count is smaller than the first erroneous operation count, thereby terminating the trial license of the application program.

\* \* \* \* \*